(12) United States Patent
Hechler, IV

(10) Patent No.: US 6,211,502 B1
(45) Date of Patent: Apr. 3, 2001

(54) BACON COOKER

(76) Inventor: Valentine Hechler, IV, 26 Meadow View Dr., Northfield, IL (US) 60093

( * ) Notice: Subject to any disclaimer, the term of this patent is extended or adjusted under 35 U.S.C. 154(b) by 0 days.

(21) Appl. No.: 09/365,724

(22) Filed: Aug. 3, 1999

(51) Int. Cl.$^7$ .................................................. H05B 6/80
(52) U.S. Cl. .......................... 219/732; 219/733; 219/735; 219/762; 426/118; 426/243; 99/DIG. 14; 99/425; 99/444
(58) Field of Search ..................................... 219/732, 733, 219/734, 735, 725, 762; 426/107, 118, 234, 241, 243; 99/DIG. 14, 427, 425, 444, 446, 448, 449

(56) References Cited

U.S. PATENT DOCUMENTS

| D. 318,206 | 7/1991 | Watznauer | D7/409 |
|---|---|---|---|
| D. 366,807 | 2/1996 | Fleck et al. | D7/361 |
| 4,074,102 | 2/1978 | Asen | 219/10.55 |
| 4,112,833 | 9/1978 | Oda et al. | 99/425 |
| 4,214,515 | 7/1980 | Kubiatowicz | 99/400 |
| 4,343,978 | 8/1982 | Kubatowicz | 219/10.55 |
| 4,486,640 | * 12/1984 | Bowen et al. | 219/732 |
| 4,721,835 | * 1/1988 | Welker | 219/732 |
| 4,924,049 | 5/1990 | Dexter, Jr. | 219/10.55 |
| 4,933,528 | 6/1990 | Barr | 219/10.55 |
| 4,950,524 | * 8/1990 | Hacker et al. | 428/163 |
| 5,093,176 | * 3/1992 | Pribonic et al. | 428/76 |
| 5,151,568 | * 9/1992 | Rippley | 219/733 |

* cited by examiner

Primary Examiner—Philip H. Leung
(74) Attorney, Agent, or Firm—Nixon Peabody LLP; Daniel W. Sixbey

(57) ABSTRACT

A bacon cooker and method for the microwave cooking of bacon. The bacon cooker includes a cover unit for releasably retaining a microwave permeable container having an open end with an annular, laterally projecting rim. The cover unit is designed to extend over the open end of the container and includes a plurality of cam locks which engage the container rim and force the rim into engagement with the underside of the cover unit. The cover unit is provided with a steam vent which includes an elongate, open ended shaft extending outwardly from the cover into the container. A plurality of radially extending arms are affixed to the shaft in spaced relationship to the cover. A hydrophilic material isi placed in the bottom of the container.

19 Claims, 2 Drawing Sheets

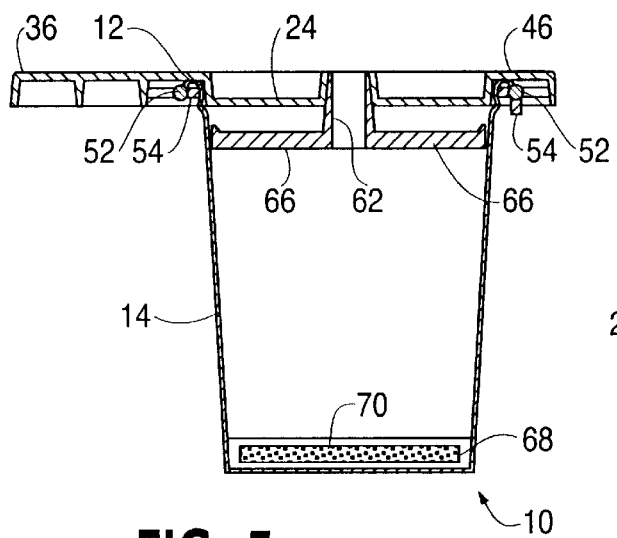
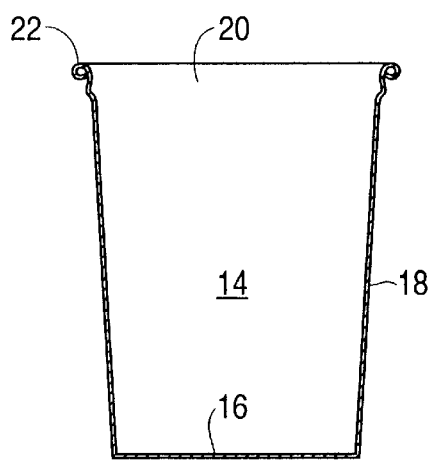
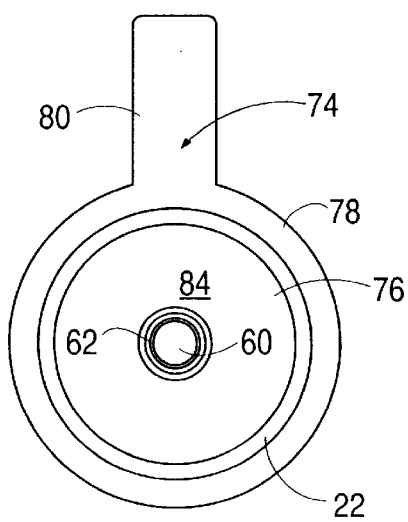
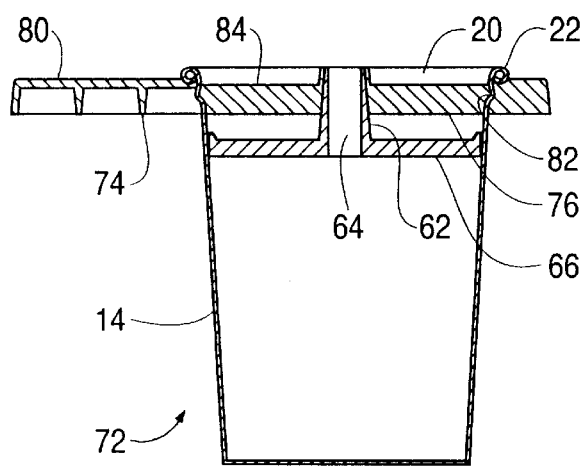

BACON COOKER

TECHNICAL FIELD

The present invention relates to an apparatus for cooking bacon or the like in a microwave oven.

BACKGROUND

Uncooked strips of bacon can be prepared for eating by frying the bacon in a skillet or by cooking the bacon in a microwave oven. Microwave cooking is often preferred due to the shorter time necessary to cook the bacon. Various microwave bacon cooker devices are known for holding the bacon during cooking including those shown by U.S. Pat. Nos. D318,206; D366,807; 4,074,102; 4,112,833; 4,214,515; 4,343,978; 4,924,049; and 4,933,528.

Various concerns and problems arise when cooking bacon in a microwave oven. The grease produced during cooking is both messy and hot, and must be retained for disposal. Bacon that is allowed to cook on a horizontal surface will often become soaked with grease, rendering the food unpalatable. In the case of a cooking device that holds the bacon, it is desirable that the device be easy to manufacture and easy to use, while at the same time allowing for aesthetically pleasing, properly cooked, and good tasting bacon. Also, case of cleanup is a major concern. Ideally, because of the possibility of splattering grease generated during the cooking of the bacon, it would be beneficial to cook the bacon in a closed container. However, there is a need for microwave bacon cooking devices that more fully address these and other concerns and problems.

No prior art sufficiently addresses the problem of superheated steam eruptions that occur when cooking bacon. As bacon cooks in a closed container, all of the fat that drips from the bacon collects as a liquid at the bottom of the container. Most of the moisture that effervesces as steam from the bacon will be vented from the container, but some will condense as droplets on the cooler surfaces of the container and run down into the hot fat. Because water is heavier than liquid fat, it drops below the fat, where microwave energy then heats this water and converts it back to steam. It is superheated because of the weight of the fat above it, and gets more so as the layer of fat becomes thicker. Sporadically, this steam erupts in noisy bursts that can be heard outside of the oven. These steam releases can disintegrate the bacon and blow the top off the cooking container.

DISCLOSURE OF THE INVENTION

It is a primary object of the present invention is to provide a novel and improved apparatus for cooking bacon or other similar food strips in a microwave oven while minimizing the problems associated with prior apparatus.

A further object of the present invention is to provide a novel and improved apparatus for cooking bacon or the like in a microwave oven while preventing the mess associated with prior art apparatus.

Yet a further object of the present invention is to provide a novel and improved apparatus for cooking bacon or the like in a microwave oven while preventing the destructive explosions of superheated steam that are common with prior art apparatus.

It is a further object of the present invention to provide a novel and improved bacon cooker having a cover unit for closing the open end of a microwave permeable container. The container is provided with an annular rim at the open end, and the cover includes cam locks which engage and force the rim against the cover.

Yet another object of the present invention is to provide a novel and improved bacon cooker having a cover for engaging and closing the open end of a container. The cover is provided with a steam vent formed by an elongate, open ended shaft which defines a vent passage of constricted cross section to prevent liquid fat from exiting through the steam vent.

A still further object of the present invention is to provide a novel and improved method of microwave cooking bacon in a closed container which involves placing a layer of water absorbent hydrophylic material which is not bacon fat absorbent in the bottom of the container.

These and other objects of the present invention are achieved by providing a microwave permeable cover unit for releasably retaining a microwave permeable container having an open end with an annular, laterally projecting rim. The cover unit is designed to extend over the open end of the container and includes a plurality of cam locks which engage the container rim and force the rim into engagement with the underside of the cover unit. The cover unit is provided with a steam vent which includes an elongate, open ended shaft extending outwardly from the cover unit into the container. A plurality of radially extending arms are affixed to the shaft in spaced relationship to the cover.

BRIEF DESCRIPTION OF THE DRAWINGS

FIG. 3 is a cross sectional view of the bacon cooker of FIG. 1;

FIG. 4 is a cross sectional view of a container for the bacon cooker of the present invention;

FIG. 5 is a plan view of a second embodiment of the bacon cooker of the present invention; and FIG. 6 is a cross sectional view of the bacon cooker of FIG. 5.

DESCRIPTION OF THE DESCRIPTIONS

Figure 1:
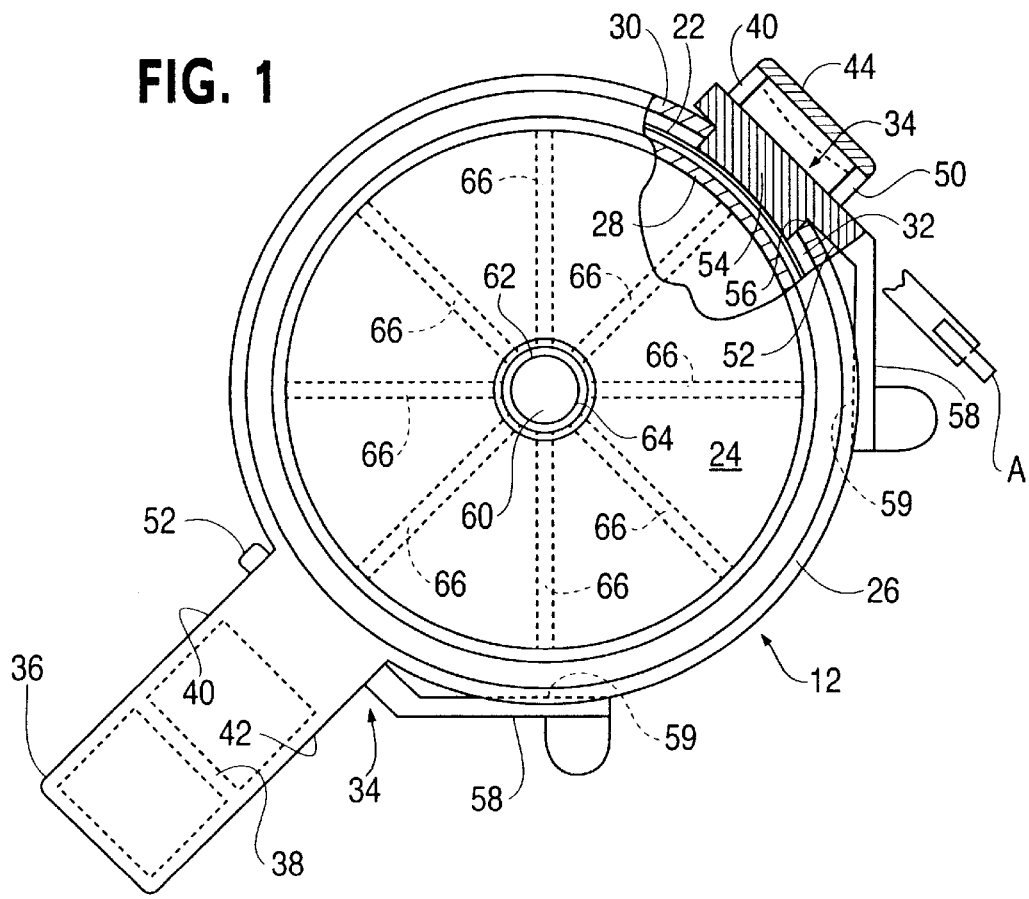
FIG. 1 is a partially cutaway plan view of the bacon cooker of the present invention.

Referring now to FIGS. 1–4, the bacon cooker of the present invention indicated generally at 10 consists of a unitary, one piece microwave permeable cover unit 12 which is formed to cooperate with a rimmed, disposable microwave permeable container 14. For purposes of illustration, the cover unit 12 has been shown for use with a cylindrical container, but it should be recognized that the cover can be configured to cooperate with a rimmed container of any shape. As shown in FIGS. 1–4, the container 14 has a bottom wall 16 and a sidewall 18 terminating at an open end 20 is defined by an annular, laterally projecting rim 22 of the type found on many conventional containers. Ideally, the cover 12 and the container 14 are made of low cost plastic which retains stiffness and strength at the elevated temperatures involved in microwaving bacon and the retention of hot grease. Disposable thin gauge, polypropylene containers of the type readily available for delicatessen use are ideal for use as the container 14.

Figure 2:
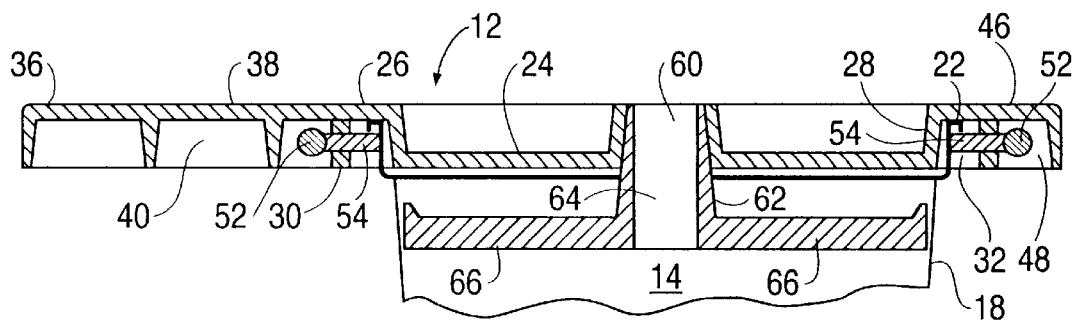
FIG. 2 is a sectional view of the top section of the bacon cooker of FIG. 1.

The cover unit 12 is a unitary, molded plastic unit which includes a top cover wall 24 recessed below a raised peripheral rim wall 26 which is joined to the cover wall by an intermediate joinder wall 28. Spaced from the intermediate joinder wall and extending downwardly substantially parallel thereto from the peripheral rim wall is an outer wall 30 which with the joinder wall and peripheral rim wall defines a container rim receiving compartment 32 extending annularly around the top cover wall 24. As shown in FIGS. 2 and 3, the rim 22 of a container 14 is inserted into the rim receiving compartment 32 until it engages the underside of the peripheral rim wall 26. In this position, the joinder wall 28 and cover wall 24 extend into the open end 20 of the container. The rim receiving compartment 32 can be made large enough to receive containers having open ends of different diameters.

It is important for the container 14 to be firmly attached to the cover unit 12 during the microwave cooking process, for if the cover unit should become detached, the microwave oven will be splattered with grease exiting the open end of the container. To removably secure a container in place, the cover unit is provided with two or more cam locks 34 which engage the underside of the container rim 22 and force the rim against the bottom of the rim wall 26 where the cam locks lock in place. One cam lock is mounted in a handle 36 which extends laterally from the rim wall 26 and the outer wall 30. This handle includes a handle top wall 38 which is coextensive with the rim wall 26 and which joins spaced, downwardly extending handle sidewalls 40 and 42.

A second cam lock is mounted in a lock mount 44 which extends laterally from the rim wall 26 and the outer wall 30. This lock mount is positioned opposite to the handle 36 and includes a top wall 46 which is coextensive with the rim wall 26 and which joins downwardly extending, spaced lock mount sidewalls 48 and 50.

The construction of the cam locks 34 is identical. Each cam lock includes a pivot pin 52 mounted for pivotal movement. The pivot pin for one cam lock extends between the handle sidewalls 40 and 42 and is mounted for rotation therein, while the pivot pin for the opposed cam lock extends between the lock mount sidewalls 48 and 50 and is mounted for rotation therein. Each pivot pin includes a laterally projecting, curved cam section 54 which projects, in the locked position shown in FIGS. 1–3, through an opening 56 in the outer wall 30 into the rim receiving compartment 32. The opening 56 is of sufficient size to permit the cam section 54 to pivot between the locked position of FIGS. 1–3 downwardly to a substantially vertical unlocked position to release a container.

An inwardly inclined, actuator lever arm 58 is connected to one end of the pivot pin 52 to rotate the pivot pin and to lock the cam lock. The lever arm 58 is angled to frictionally engage the outer wall 30 when the cam section 54 has been pivoted thereby into engagement with the underside of a container rim 22 to force the container rim into engagement with the underside of the peripheral rim wall 26. This frictional engagement locks the lever arm, the pivot pin and the cam section in place. The outer surface of the outer wall 30 may be provided with indented lock slots, shown in broken lines 59, to receive the lever arm 58 in the locked position. Alternatively, projections may be formed on the outer wall and the lever arms snap over a projection to lock. To remove the container, the lever arm is forced downwardly against the frictional force with the outer wall 30, a lock slot or a projection to cause the pivot pin to pivot the cam section 54 downwardly to a vertical position where the lever arm will be positioned at A in FIG. 1.

To attach a clean container to the cover unit 12, the process is reversed. With the cam sections of the two cam locks in the vertical, unlocked position, the open end of a container is inserted over the joinder wall 28 into the rim receiving compartment 32 until the container rim 22 rests against the underside of the rim wall 26. Then the levers 58 of the two cam locks are moved into the locking position by pivoting the pivot pin 52 to move the cam section upwardly until it engages and forces the rim 22 against the underside of the rim wall 26.

The cover wall 24 is provided with a central vent opening 60 which is of sufficient size to vent steam from the bacon cooker during microwave cooking but which is constructed to prevent significant passage of grease from the container. The vent opening is defined by an open ended shaft 62 which is secured to the cover wall at one end and extends outwardly therefrom to a point spaced from the underside of the cover wall. This shaft defines a central vent passage 64 which opens at the upper end in the vent opening 60. The central passage is of sufficient cross sectional area to vent steam from the container but is constricted enough to retain grease. Grease entering the lower end of the central passage is inclined to splatter against the passage walls and run back into the container without passing through the opening 60.

Extending radially outward from the lower end of the shaft 62 in spaced relation to cover wall 24 are a plurality of spaced arms 66 over which bacon is hung for cooking. These arms are dimensioned to fit within containers 14 which are used with the cover unit 12.

Only by using an enclosed, covered cooking unit that contains grease splatter can bacon be effectively cooked in a microwave without having bacon grease soil the surface of the microwave. However, when bacon is microwaved in a enclosed cooker, the cooker can blow up. All animal fats are composed of glyceryl esters of fatty acids, and as they cook, they release water in the form of steam, a process called effervescence. As bacon cooks, all of the fat that drips from the bacon collects as liquid fat at the bottom of an enclosed cooker. The steam that effervesces from the bacon builds pressure that can blow the lid from an enclosed cooker. Even venting the steam from the enclosure, as has been done by the central passage 64, does not completely insure that the cover unit 12 will always remain attached to the container 14 during the cooking of bacon. Although most of the steam that effervesces from the bacon will be vented through the central passage 64, some will condense on the cooler sides of the container 14 as droplets which run down into the hot grease in the bottom of the container. The water collects below the liquid bacon fat, and continued microwave energy then heats this water and converts it back to steam. The water is superheated due to the weight of the liquid bacon fat above it, and gets more so as the layer of liquid fat gets thicker. This steam can erupt in noisy bursts which, in some cases, might disintegrate the bacon and blow the cover unit 12 off the container 14.

To prevent superheated steam eruptions from beneath the liquid fat layer during microwave bacon cooking, it is necessary to prevent water droplets from forming larger concentrations of water beneath the fat layer which can be superheated to form disruptive vapor eruptions. This can be accomplished by forming a layer 68 of hydrophilic material at the bottom of the container 14. The hydrophilic material must have the ability to absorb water without absorbing substantial amounts of liquid bacon fat, and can be a food grade material such as instant rice. The hydrophilic material can be contained in a water permeable container or package 70 which is inserted into the bottom of the container 14 and can be attached to the container to insure that the hydrophilic material remains below the liquid in the container to form the layer 68. The material must be heavier than liquid fat so that it won't float and will remain below the liquid bacon fat layer.

The hydrophilic layer 68 may also be formed by mixing a hydrophilic substance such as corn starch with cooking oil to create a viscous pourable liquid or a stiffer paste. Also, the paste when applied in a layer to the bottom of the container 14 as it absorbs water is heavy enough to remain below the layer of liquid bacon fat during microwave cooking of the bacon.

A hydrophilic substance in tablet form can be inserted into the container 14 or permanently formed as a layer 68 secured to the bottom wall 16 of the container. The tablet or layer is formed by mixing melted paraffin or a similar heat meltable wax substance with corn starch or other powdered hydrophylic material to form a thick paste and then letting the layer or tablet harden. During bacon cooking, the paraffin or other wax melts exposing the hydrophylic material to water droplets in the container.

A second embodiment of the bacon cooker is illustrated at 72 in FIGS. 5 and 6. Here, structural units which are the same as those previously described will be given the same reference numerals. In the bacon cooker 72, there is a separate handle unit 74 and cover 76. The handle unit includes a holder 78 which is molded as a one piece plastic unit with a laterally projecting handle 80. The holder defines a central opening 82 to receive a container 14. Here the holder has been shown as a circular unit with a circular central opening, but the holder and central opening can be formed to match the shape of any suitable container.

The central opening 82 in the holder 78 has a diameter which is less than the diameter of the rim 22 for the container 14, so that when the container is inserted in the central opening, the rim overlies and rests on the holder 78. With the container in place in the holder, a top 84 dimensioned to fit tightly in the upper portion of the container is inserted into the open end of the container. The top is designed to engage the sidewall of the container below the rim 22 and to press the sidewall against the holder 78. After cooking is completed, the top is removed from the container so that the container can be removed from the holder. The top is formed with the vent structure and spaced bacon holding arms previously described.

I claim:

1. A bacon retainer and cover for use in the microwave cooking of bacon adapted to engage a container having at least a container sidewall with an inner and outer surface, an open end and a laterally projecting rim at the container open end defining a rim undersurface comprising:

a body having a top wall dimensioned to extend across the open end of said container when said bacon retainer and cover is in engagement with said container a vent assembly formed on said top wall, said vent assembly including an elongate, open ended shaft having a first end mounted on said top wall to define a vent opening and extending outwardly therefrom to a second end, said shaft defining a central vent passage extending between the shaft open ends, and communicating with said vent opening, and a plurality of spaced arms mounted on said shaft adjacent to the second end thereof and extending outwardly from said shaft in spaced relation to the top wall.

2. The bacon retainer and cover of claim 1, wherein a plurality of container locks are mounted on said body for movement between a locked position and an unlocked position, said container locks being positioned such that in the unlocked position, a container may be positioned in engagement with the body or removed from engagement with the body, said container locks being positioned to move from an unlocked position into a locked position to engage the undersurface of said rim when the container is positioned in engagement with said body.

3. The bacon retainer and cover of claim 2 wherein said container locks each include a cam section to engage and force said rim against the body in the locked position of the container locks.

4. The bacon retainer and cover of claim 2 wherein said body includes an outer wall extending outwardly from the periphery of said top wall transversely thereto and spaced from said shaft, a lock mount for each container lock mounted on said outer wall and extending outwardly therefrom, a cam opening formed in said outer wall adjacent to said lock mount, each said container lock being mounted for pivotal movement on said lock mount and including a cam section which extends through the cam opening in said outer wall, said cam section operating to engage the undersurface of said rim to force said rim against said body in the locked position of the container lock.

5. The bacon retainer and cover of claim 4 wherein each said container lock includes an operating lever connected to pivot said container lock between the locked and unlocked positions, said outer wall including a lock slot to receive said operating lever in the locked position of said container lock.

6. The bacon retainer and cover of claim 2 wherein said top wall includes a recessed cover wall adapted to be positioned within the container through the open end and thereof when the container is in engagement with said body, a raised peripheral rim wall spaced from said cover wall and extending outwardly from the periphery of said cover wall in substantially parallel relationship thereto, an intermediate joinder wall connecting the periphery of said cover wall to said raised peripheral rim wall, and an outer wall connected to said raised peripheral rim wall and extending in spaced substantially parallel relationship to said intermediate joinder wall, said outer wall, raised peripheral rim wall and intermediate joinder wall defining a container rim receiving compartment for receiving the rim of said container.

7. The bacon retainer and cover of claim 6 wherein said body includes a lock mount for each container lock mounted on said outer wall and extending outwardly therefrom, a cam opening formed in said outer wall adjacent to each lock mount and extending through said outer wall to said container rim receiving compartment, each said container lock being mounted for pivotal movement between the locked and unlocked positions on a lock mount and including a cam section which extends through the cam opening, said cam section operating to engage the undersurface of said rim to force said rim against said raised peripheral rim wall in the locked position of the container lock.

8. The bacon retainer and cover of claim 7 wherein each said container lock includes an operating lever connected to pivot said container lock between the locked and unlocked positions, the outer wall including a lock slot to receive said operating lever in the locked position of said container lock.

9. The bacon retainer and cover of claim 8 wherein a handle is connected to said outer wall and projects laterally therefrom.

10. The bacon retainer and cover of claim 1 wherein said body includes a peripheral sidewall formed to extend around said top wall, said top wall and peripheral sidewall being dimensioned for insertion into the open end of said container with said peripheral sidewall in engagement with the inner surface of the container sidewall adjacent to the laterally projecting rim, and a container holder for holding said container and engaging the undersurface of said laterally projecting rim, said container holder having a container receiving opening sized to receive and engage the outer surface of the container sidewall while permitting the undersurface of said rim to rest on said container holder annularly of said container receiving opening.

11. The bacon retainer and cover of claim 10 wherein a handle is formed on said container holder and extends laterally therefrom.

12. A bacon cooker for use in the microwave cooking of bacon comprising:

a container having at least one container sidewall, a container bottom wall connected to said container sidewall, said container sidewall defining a container open end spaced from said bottom wall, and a unitary bacon retainer and cover unit attached to said container and including a top wall dimensioned to extend across and close the open end of said container, said top wall including a vent for venting the interior of said container, and a bacon retaining rack secured to and supported by said top wall and extending outwardly therefrom into said container, said rack including a plurality of spaced arms which are spaced below but extend substantially parallel to said top wall and are spaced from said container bottom wall when said bacon retainer and cover unit is attached to said container.

13. The bacon cooker of claim 12 wherein a layer of hydrophilic material is provided on the bottom wall of said container, said hydrophilic material being water absorbent but resistant to the absorption of liquid bacon fat.

14. A bacon cooker for use in the microwave cooking of bacon comprising:

a container having at least one container sidewall, a container bottom wall connected to said container sidewall, said container sidewall defining a container open end spaced from said bottom wall, and a bacon retainer and cover unit attached to said container and including a top wall dimensioned to extend across the open end of said container and a vent opening formed in said top wall, and a bacon retaining rack connected to said top wall and extending outwardly therefrom into said container, said rack including a plurality of spaced arms which are spaced from but extend substantially parallel to said top wall, said bacon retaining rack including an elongate, open ended shaft having a first end mounted on said top wall and extending outwardly therefrom to a second end, the shaft defining a central vent passage extending between the shaft open ends and communicating with said vent opening, said spaced arms being mounted on said shaft adjacent to the second end thereof and extending outwardly from said shaft above the bottom wall of said container.

15. The bacon cooker of claim 14 wherein a layer of hydrophylic material is provided on the bottom wall of said container, said hydrophylic material being water absorbent but resistant to the absorption of liquid bacon fat.

16. A method for microwave cooking bacon which includes;

suspending strips of bacon in spaced relationship to the bottom wall of a microwave permeable container, placing a hydrophilic material with the ability to absorb water without absorbing substantial amounts of liquid bacon fat on the bottom of the container by forming a layer of hydrophilic material of hydrophilic particles which will not float in liquid bacon fat, and subjecting the container and bacon strips to microwave energy.

17. The method of claim 16 wherein said hydrophilic particles are formed by instant rice.

18. A method for microwave cooking bacon which includes;

suspending strips of bacon in spaced relationship to the bottom wall of a microwave permeable container, placing a hydrophilic material with the ability to absorb water without absorbing substantial amounts of liquid bacon fat on the bottom of the container, said hydrophilic material is a paste formed of cooking oil and corn starch, and subjecting the container and bacon strip to microwave energy.

19. A method for microwave cooking bacon which includes;

suspending strips of bacon in spaced relationship to the bottom wall of a microwave permeable container, placing a hydrophilic material with the ability to absorb water without absorbing substantial amounts of liquid bacon fat on the bottom of the container, said hydrophilic material is a mixture of wax and a hydrophilic powdered material, and subjecting the container and bacon strip to microwave energy.

* * * * *